(12) United States Patent
Nashif

(10) Patent No.: US 6,621,658 B1
(45) Date of Patent: Sep. 16, 2003

(54) VIBRATION DAMPING LAMINATE WITH VIBRATION ISOLATING CUT THEREIN

(75) Inventor: Ahid Nashif, Cincinnati, OH (US)

(73) Assignee: Material Sciences Corporation, Elk Grove Village, IL (US)

(*) Notice: Subject to any disclaimer, the term of this patent is extended or adjusted under 35 U.S.C. 154(b) by 29 days.

(21) Appl. No.: 09/616,133

(22) Filed: Jul. 13, 2000

Related U.S. Application Data
(60) Provisional application No. 60/143,910, filed on Jul. 14, 1999.

(51) Int. Cl.$^7$ .............................................. G11B 33/08
(52) U.S. Cl. ..................... 360/97.02; 428/75; 428/137
(58) Field of Search ........................ 360/97.01–98.01; 428/75, 137, 615, 551; 181/207, 208; 361/679, 683, 684, 685

(56) References Cited

U.S. PATENT DOCUMENTS

| | | | | |
|---|---|---|---|---|
| 4,797,762 A | | 1/1989 | Levy et al. | 360/99.06 |
| 4,819,094 A | | 4/1989 | Oberg | 360/137 |
| 4,833,667 A | | 5/1989 | Castagna et al. | 369/263 |
| 4,905,110 A | | 2/1990 | Krum et al. | 360/99.08 |
| 4,924,976 A | | 5/1990 | Bernett | 188/378 |
| 4,965,686 A | | 10/1990 | Young et al. | 360/98.07 |
| 5,101,305 A | | 3/1992 | Ohkita et al. | 360/97.02 |
| 5,214,549 A | | 5/1993 | Baker et al. | 360/97.02 |
| 5,271,142 A | * | 12/1993 | Moore et al. | 29/469.5 |
| 5,343,665 A | * | 9/1994 | Palmersten | 52/588.1 |
| 5,418,073 A | * | 5/1995 | Loth et al. | 428/625 |
| 5,430,589 A | | 7/1995 | Moir et al. | 360/97.02 |
| 5,430,590 A | | 7/1995 | Ainslie et al. | 360/98.07 |
| 5,483,397 A | | 1/1996 | Gifford et al. | 360/97.01 |
| 5,504,637 A | | 4/1996 | Asada et al. | 360/98.07 |
| 5,517,375 A | | 5/1996 | Dion et al. | 360/98.07 |
| 5,602,370 A | * | 2/1997 | Kau | 200/61.43 |
| 5,619,389 A | | 4/1997 | Dunfield et al. | 360/98.07 |
| 5,645,626 A | * | 7/1997 | Edlund et al. | 95/56 |
| 5,725,931 A | | 3/1998 | Landin et al. | 428/134 |
| 5,771,135 A | | 6/1998 | Ruiz et al. | 360/104 |
| 5,790,344 A | | 8/1998 | Allen | 360/97.02 |
| 5,825,585 A | | 10/1998 | Hatam-Tabrizi | 360/97.02 |
| 5,858,509 A | | 1/1999 | Polch et al. | 428/166 |
| 5,875,067 A | * | 2/1999 | Morris et al. | 360/97.01 |
| 5,896,242 A | | 4/1999 | Albrecht et al. | 360/99.08 |
| 5,914,837 A | | 6/1999 | Edwards et al. | 360/106 |
| 5,958,603 A | * | 9/1999 | Ragland et al. | 428/595 |
| 5,962,118 A | * | 10/1999 | Burgess | 428/308.4 |
| 6,005,750 A | | 12/1999 | Willard et al. | 360/97.02 |
| 6,006,874 A | | 12/1999 | Johnson | 188/378 |
| 6,012,493 A | * | 1/2000 | Remke et al. | 138/38 |
| 6,177,173 B1 | * | 1/2001 | Nelson | 428/137 |
| 6,202,462 B1 | * | 3/2001 | Hansen et al. | 72/199 |
| 6,249,400 B1 | * | 6/2001 | Hong et al. | 360/97.02 |
| 6,251,208 B1 | * | 6/2001 | Serizawa et al. | 156/232 |
| 6,266,207 B1 | * | 7/2001 | Iwahara et al. | 360/97.02 |
| 6,275,352 B1 | * | 8/2001 | Tadepalli et al. | 360/97.02 |
| 6,308,961 B1 | * | 10/2001 | Kunikane et al. | 277/637 |
| 6,387,535 B1 | * | 5/2002 | Mantel | 428/608 |
| 6,428,905 B1 | * | 8/2002 | Behr et al. | 428/594 |

* cited by examiner

*Primary Examiner*—Jefferson Evans
(74) *Attorney, Agent, or Firm*—Seyfarth shaw

(57) ABSTRACT

There is provided a vibration damping structure having an inner metal skin and an outer metal skin and a damping layer secured between the metal skins, with each of said metal skins having a cut therein. The damping layer is a viscoelastic material which is capable of adhering to the metal skins. The cuts are circular, encompassing and isolating an area wherein the vibration damping structure is connected to another body. The cuts extend through the inner metal skin and the outer metal skin to the damping layer.

24 Claims, 2 Drawing Sheets

VIBRATION DAMPING LAMINATE WITH VIBRATION ISOLATING CUT THEREIN

RELATED APPLICATION

This application claims the benefit of the filing date of copending U.S. Provisional Application No. 60/143,910, filed Jul. 14, 1999.

BACKGROUND

The present invention relates to the reduction of vibration and noise by damping constructions, and particularly such damping constructions utilizing a layer of viscoelastic damping material. The invention has application to damping vibrations in vibrating or vibration generating systems, such as computer disk drive assemblies, automotive body panels, electronic cabinetry, or motor shrouds.

Vibrational energy or force is often transmitted from its source to another structure through a bolt, a screw or other connecting means which connects the vibrational source to the structure. In many applications this transmission of vibrational energy or force has a deleterious effect, often creating noise or excessive wear in critical components. Consequently, the ability to stop or reduce the transmission of vibrational energy or force is of great importance in certain applications.

For example, disk drive assemblies often require a relatively vibration-free environment to function optimally. The rotating parts of disk drive assemblies can inherently generate vibration and noise which, at certain levels, can degrade the performance of the drive assembly. Referring to FIG. 1, there is illustrated a portion of a prior art disk drive assembly 10 which has a spindle 11 having a fixed inner portion 12 and a rotating outer portion 13. The disk drive assembly housing has a cover 14 which is fastened to the inner portion 12 of the spindle 11, as by a screw 15. This construction permits vibrations to be mechanically coupled to the cover 14 through the spindle portion 12 and the screw 15.

To reduce the vibrations of the disk drive assembly, the arrangement of FIG. 2 was introduced. In this arrangement the head of the screw 15 passes through a hole 16 in the cover 14. The screw shank also passes through and engages a washer 17, known as a "whirl" washer, and an overlying viscoelastic layer 18, which are interposed between the spindle portion 12 and the cover 14. The washer 17 may be formed of stainless steel, having a thickness in the range of from about 10 mils to about 20 mils, and the viscoelastic layer 18 may have a thickness of about 1–10 mils and could, if desired, be formed by a viscoelastic tape. The layer 18 serves to adhesively secure the cover 14 to the washer 17 which is, in turn, fixed to the spindle portion 12 by the screw 15. Thus, mechanical transmission of vibration from the spindle to the cover 14 is inhibited. The washer 17 and viscoelastic layer 18 serve to isolate the cover 14 from the spindle 11 at high frequencies and introduce damping into the system of the disk drive and cover assembly at lower frequencies.

Another approach is to damp any vibrations which do get transmitted into the cover 14, by applying to its outer surface a damping construction, which may be a constrained-layer arrangement including a metal skin having a viscoelastic polymer adhesive on one side thereof which is secured to the outer surface of the cover 14.

While these prior arrangements, particularly in combination, are effective in damping vibrations, they are relatively expensive to manufacture, involving assembly of a number of parts.

SUMMARY

It is a general object of the invention to provide an improved vibration damping arrangement which avoids the disadvantages of prior arrangements, while affording additional structural and operating advantages.

An important feature of the invention is the provision of a damping arrangement of the type set forth, which is of relatively simple and economical construction.

Another feature of the invention is the provision of a damping arrangement which is adaptable for use in the covers of disk drive assemblies to introduce high damping and to isolate the cover from the mechanical transmission of vibration thereto from the drive assembly.

The invention consists of certain novel features and a combination of parts hereinafter fully described, illustrated in the accompanying drawings, it being understood that various changes in the details may be made without departing from the spirit, or sacrificing any of the advantages of the present invention.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
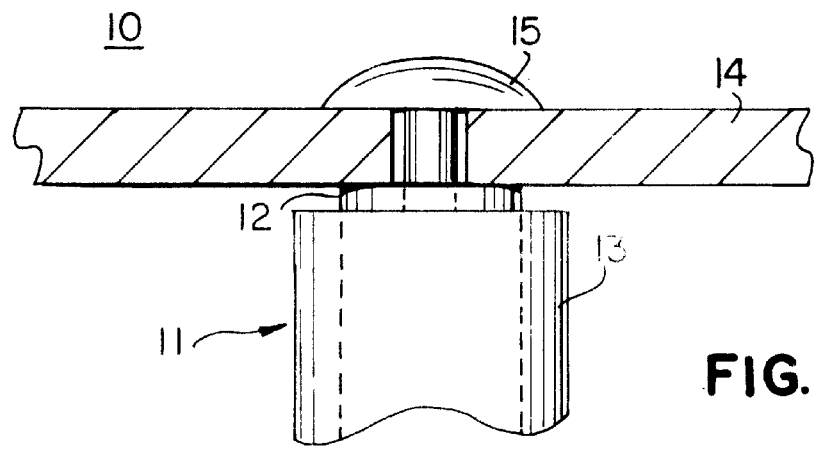
FIG. 1 is a fragmentary view in vertical section through a portion of a prior art disk drive assembly.
Figure 2:
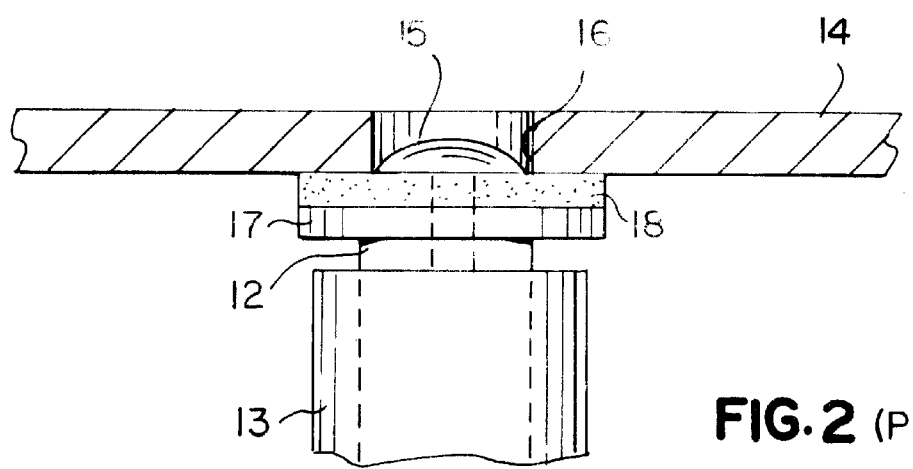
FIG. 2 is a view similar to FIG. 1, illustrating a prior art vibration damping arrangement.
Figure 3:
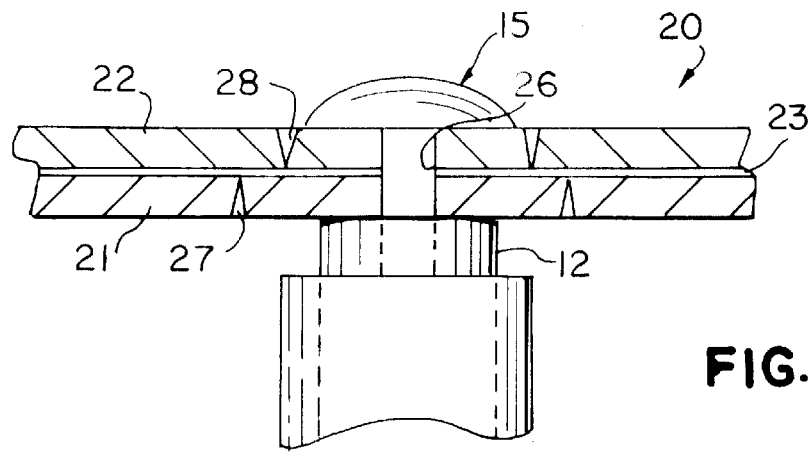
FIG. 3 is a view similar to FIG. 1, illustrating an embodiment of the present invention.
Figure 4:
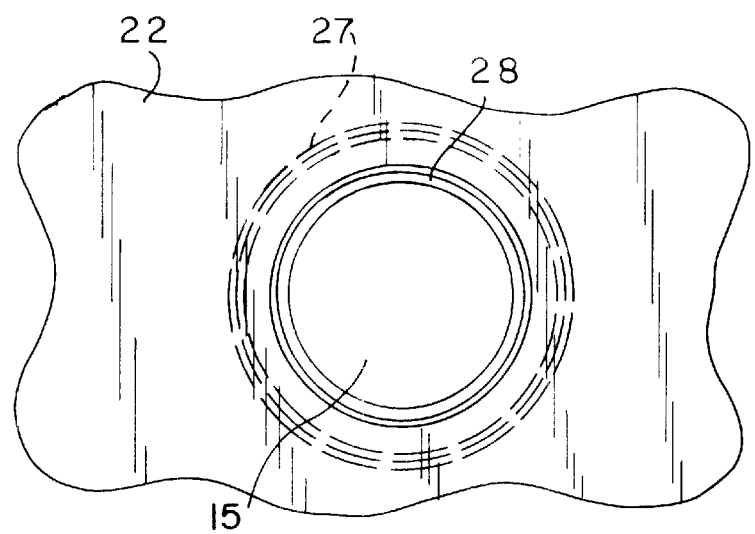
FIG. 4 is a fragmentary top plan view of the embodiment of FIG. 3.

Referring to FIGS. 3 and 4, an embodiment of the present invention involves constructing the cover of the disk drive assembly 10 to include a vibration damping structure, and eliminating the whirl washer. This cover construction offers the same advantages as applying a constrained-layer damping construction to the outer surface of the prior art cover 14, but is much simpler and less expensive to fabricate. In this embodiment a damped metal laminate cover 20 has inner and outer metal skins 21 and 22 secured together and spaced apart by a viscoelastic layer 23. The shank of the screw 15 passes through a hole 26 in the cover 20 dimensioned so that the shank engages the cover, and the cover 20 is clamped between the head of the screw 15 and the fixed portion 12 of the spindle, as seen in FIG. 3. In order to isolate vibrations from the cover 20, the inner skin 21 is provided with a circular cut 27 therein coaxial with the screw 15, and the outer skin 22 has a circular cut 28 therein, also coaxial with the screw and preferably of a slightly smaller diameter than the cut 27. Preferably, each of the cuts 27 and 28 passes through the entire thickness of the associated metal skin, to the viscoelastic layer 23. Thus, while mechanical vibrations can be transmitted directly to the portion of the cover 20 immediately surrounding the screw 15, that portion is effectively isolated by the cuts 27 and 28 from the rest of the cover 20. Thus, these isolation cuts serve effectively the same purpose as the prior art whirl washer 17 and viscoelastic layer 18 and prevent vibrations from propagating into the cover.

While, in the illustrated embodiment, the cuts are generally V-shaped in transverse cross section, it will be appreciated that they could have other cross sections, such as being straight-sided or the like, the important point being to sever or isolate most of the skin area from the portion immediately surrounding the screw 15.

Preferably, the cuts 27 and 28 are formed as close as possible to the screw 15. While the cuts 27 and 28 are preferably of different diameter, it does not matter which one has the larger diameter. While circular cuts are shown, other shapes which encompass the screw 15 could be used.

While optimum isolation benefits are achieved by providing both of the cuts 27 and 28, the cover 20 could also be provided with only the cut 27 or only the cut 28 and still achieve significant damping, although not as effective as when both cuts are provided.

Figure 5:
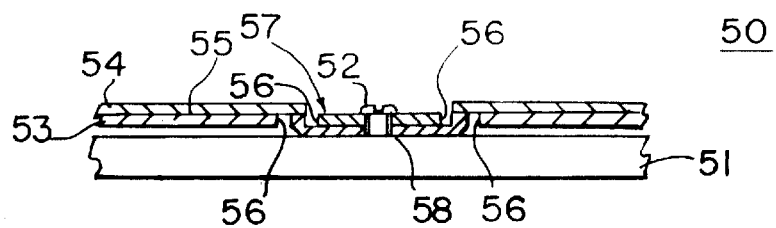
FIG. 5 is a view similar to FIG. 1, illustrating another embodiment of the present invention.

Referring to FIG. 5, there is illustrated a vibration damping structure 50 which reduces the transmission of vibration between the damping structure 50 and a body 51 attached thereto by a securing means 52 extending through an aperture 58 in the vibration damping structure 50. More specifically, the vibration damping structure 50 includes at least two metal skins 53 and 54 and a damping layer 55 secured between the metal skins 53, with each of the metal skins having a cut therein. A depression 57 surrounds the aperture 58 isolating most of the vibration damping structure 50 from direct contact with the body 51.

Preferably, there is only an inner metal skin 53 and an outer metal skin 54, but additional metal skins may be added for greater stability and support.

The damping layer 55 is preferably a viscoelastic material which is capable of adhering to the metal skins 53 and 54; however, other materials having vibration damping characteristics can be used.

The cuts 56 are preferably circular, encompassing and isolating an area of the metal skins 53 and 54 in direct contact with the connecting means 52 and the body 51. The cuts 56 preferably extend through the inner metal skin 53 and the outer metal skin 54 to the damping layer 55. While optimal vibration damping is achieved by having circular cuts extending to the damping layer, it will be appreciated that vibration damping can still be achieved if the shape and the depth of the cuts are altered.

While the invention is illustrated as being used at the attachment point of the cover to a disk drive assembly spindle, it will be appreciated that the same isolation technique could be used at any of the various fastener locations along the cover. Indeed, this isolation concept can be used in any application wherein a force, from a motor or otherwise, is being transmitted to a sheet metal component, such as a computer cabinet, set-top box, etc., where vibration and/or noise resulting therefrom could have a deleterious effect.

While, in the illustrated embodiment, the skins 21 and 22 of the cover 20 are shown as being substantially thicker than the viscoelastic layer 23, it will be appreciated that this is simply for purposes of illustration and that, in practice, the relative and absolute thicknesses of these portions may vary widely, depending upon the particular structural and damping requirements of the application.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A vibration damping structure comprising two metal skins and a damping layer secured between said metal skins, each of said metal skins having only a single linear cut therein which extends to but not through the damping layer.

2. The vibration damping structure in claim 1, wherein said damping layer is formed of a viscoelastic material.

3. The vibration damping structure in claim 1, wherein said metal skins are an inner metal skin and an outer metal skin.

4. The vibration damping structure in claim 1, wherein each cut is generally V-shaped in transverse cross section.

5. The vibration damping structure in claim 1, wherein each of the cuts extends through its associated metal skin to said damping layer.

6. The vibration damping structure in claim 1, wherein said vibration damping structure has an aperture extending therethrough, and each of the cuts is circular and coaxial to said aperture.

7. A vibration damping structure comprising two metal skins and a damping layer secured between the metal skins, each of the metal skins having only a single cut therein, the vibration damping structure having an aperture extending therethrough, each of the cuts being circular and coaxial with the aperture, the cut in one metal skin being of a different diameter than the cut in the other metal skin.

8. A vibration damping structure comprising an outer metal skin, an inner metal skin and a damping layer secured between said metal skins, said structure having an aperture therethrough, at least one of said inner and outer metal skins having a linear cut therein which completely encompasses said aperture and extends only to said damping layer.

9. The vibration damping structure in claim 8, wherein said damping layer is of a viscoelastic material.

10. The vibration damping structure in claim 8, wherein both skins have cuts encompassing said aperture.

11. The vibration damping structure in claim 10, wherein each of said cuts extends through its associated metal skin to said damping layer.

12. The vibration damping structure in claim 11, wherein each of said cuts is circular and coaxial with said aperture.

13. The vibration damping structure in claim 12, wherein each of said cuts is generally V-shaped in transverse cross section.

14. The vibration damping structure in claim 13, wherein the cuts have different radii.

15. The vibration damping structure in claim 14, further comprising a fastener extending through said aperture for securing the structure to an associated source of vibrations.

16. The vibration damping structure in claim 8, wherein said cut is coaxial with said aperture.

17. A method of forming a vibration damping structure comprising:

providing a laminate having an outer metal skin, an inner metal skin and a damping layer secured between the metal skins, forming an aperture through the laminate, and forming in at least one of the inner and outer metal skins of the laminate only a single narrow linear cut which extends to but not through the damping layer and completely encompasses the aperture.

18. The method of claim 17, wherein the cut extends to the damping layer.

19. The method of claim 17, wherein the forming includes forming narrow cuts respectively in the metal skins.

20. The method of claim 19, wherein the cuts are circular and have different radii.

21. The method of claim 17, wherein the cut is circular in shape.

22. The method of claim 21, wherein the cut is formed to be generally V-shaped in transverse cross section.

23. A disk drive assembly comprising:
   a cover including two metal skins and a damping layer secured between the metal skins, each of the metal skins having only a single linear cut therein which extends to but not through the damping layer, and
   a spindle connected to the cover and having a rotatable member.

24. A method of damping vibrations in a damped laminate structure connected at a coupling region to a vibration source and having two metal skins and a damping layer secured between the metal skins, the method comprising:
   defining an area of at least one of the skins surrounding the coupling region, and
   separating the area from surrounding portions of the at least one skin so that vibrations transmitted to the area are physically isolated from the surrounding portions of the at least one skin.

* * * * *